United States Patent [19]

Lawson

[11] 4,151,898

[45] May 1, 1979

[54] DUAL BRAKING SYSTEM FOR A MINE LOCOMOTIVE

[76] Inventor: Albert R. Lawson, Drift, Ky. 41619

[21] Appl. No.: 838,291

[22] Filed: Sep. 30, 1977

[51] Int. Cl.² ............................................. B61H 13/20
[52] U.S. Cl. ........................................ 188/55; 188/107
[58] Field of Search ..................... 188/52, 53, 55, 57, 188/106 F, 106 P, 107, 358, 359; 303/13, 15; 91/459

[56] References Cited

U.S. PATENT DOCUMENTS

| | | | |
|---|---|---|---|
| 869,077 | 10/1907 | Flynn | 188/55 |
| 985,889 | 3/1911 | Fisher | 188/55 |
| 3,372,544 | 3/1968 | Kirkwood | 91/459 |
| 3,387,453 | 6/1968 | Suggs | 91/459 |
| 3,703,931 | 11/1972 | Page et al. | 91/459 |
| 3,750,852 | 8/1973 | Shoemaker | 188/55 |

*Primary Examiner*—Edward R. Kazenske
*Attorney, Agent, or Firm*—Joseph Patrick Burke

[57] ABSTRACT

This disclosure is directed to a mine locomotive braking system having an independently operated back-up braking capability, responsive within a matter of several seconds in stopping power and adaptable for retrofit to virtually any existing mining locomotive braking system to form a combination having the aforementioned capabilities in combination with an existing manually operated mechanical braking device usually requiring either physical strength or weight, viz., manually dependent physical force, on the part of the mine locomotive operator to force the arcuate brake shoes in contact with the outer wheel surfaces, thus making it susceptible to extended stopping times. The system is operated by a series of push buttons; the actuation of which operates a hydraulic mechanism whose output portions cause pressure to be applied upon a brake bar by cylinders thereby causing motion of the bar which in turn operates brake shoes which apply direct pressure to the locomotive wheels. A change of direction mechanism is employed to pivotally change direction to handle the rear wheels (or front wheels) as the case may be.

4 Claims, 2 Drawing Figures

DUAL BRAKING SYSTEM FOR A MINE LOCOMOTIVE

Recently there have been established safety standards set by the United States Department of the Interior Mining Enforcement and Safety Administration requiring an independent back-up braking system for coal mine and other ore mining locomotives. A mine locomotive is a locomotive car using four wheels and usually an open cab for transporting mine cars that carry coal and other minerals along a track from one point to another. Such mine locomotives are equipped with a primary braking system which customarily is operated by the person riding in the rear portion of the locomotive cab, e.g., by the turning of a wheel which is operatively connected to a worm gear or screw which in turn applies pressure to a bar or other member to cause brake shoes to advance into contact with both the forward and rear wheels of the mine locomotive, thereby stopping the wheel motion.

THE PRIOR ART

The following United States patents are directed to various braking systems as indicated hereinbelow.

Dunlop U.S. Pat. No. 1,521,673 discloses a mine locomotive having an electrical braking system requiring installation of electrical lines and connector means to connect the braking system to the electric power source line. Thomas U.S. Pat. No. 1,558,649 shows a three position electric switch offering dual control of brakes in what is referred in this patent as an electro-pneumatic brake. This is an extremely complicated braking system compared to that of the present invention.

R.E. Miller U.S. Pat. No. 2,024,656 discloses an electro-pneumatic brake involving a complicated electrically controlled back-up for pneumatic brakes.

Logan Jr. U.S. Pat. No. 2,084,693 is directed to an electro-hydraulic control for train brake equipment stated to be particularly suitable for use on high speed trains. The complicated Logan Jr. system is hardly financially feasible for use on small coal mine locomotives, the field to which this invention pertains.

McCune U.S. Pat. No. 2,112,424 is directed to an electro-hydraulic brake system utilizing two controls for braking, one of which is a stand-by.

Conner U.S. Pat. No. 2,239,592 teaches a vehicle braking system for non-motorized railway push cars and light trailer vehicles using a hand brake to cause a toggle linkage to act on brake shoes as the sole braking system.

Browne et al. U.S. Pat. No. 2,810,610 discloses an electrical control for pneumatic train brakes and is a highly complicated system used to simultaneously apply brakes to all the cars of a train. The cost of such a system and its space requirements would preclude its use on small mine locomotives to which this invention pertains. crossbar, including arcuate Engle U.S. Pat. No. 3,954,304 is directed to a combined emergency and hand brake control system employing a friction brake actuator having a spring motor in addition to a hydraulic service motor. The Engle combined braking system is designed for use on mass transit or rapid transit-type cars and is not economically suited for a braking system on a mine locomotive car.

DETAILED DESCRIPTION OF THE INVENTION

Figure 1:
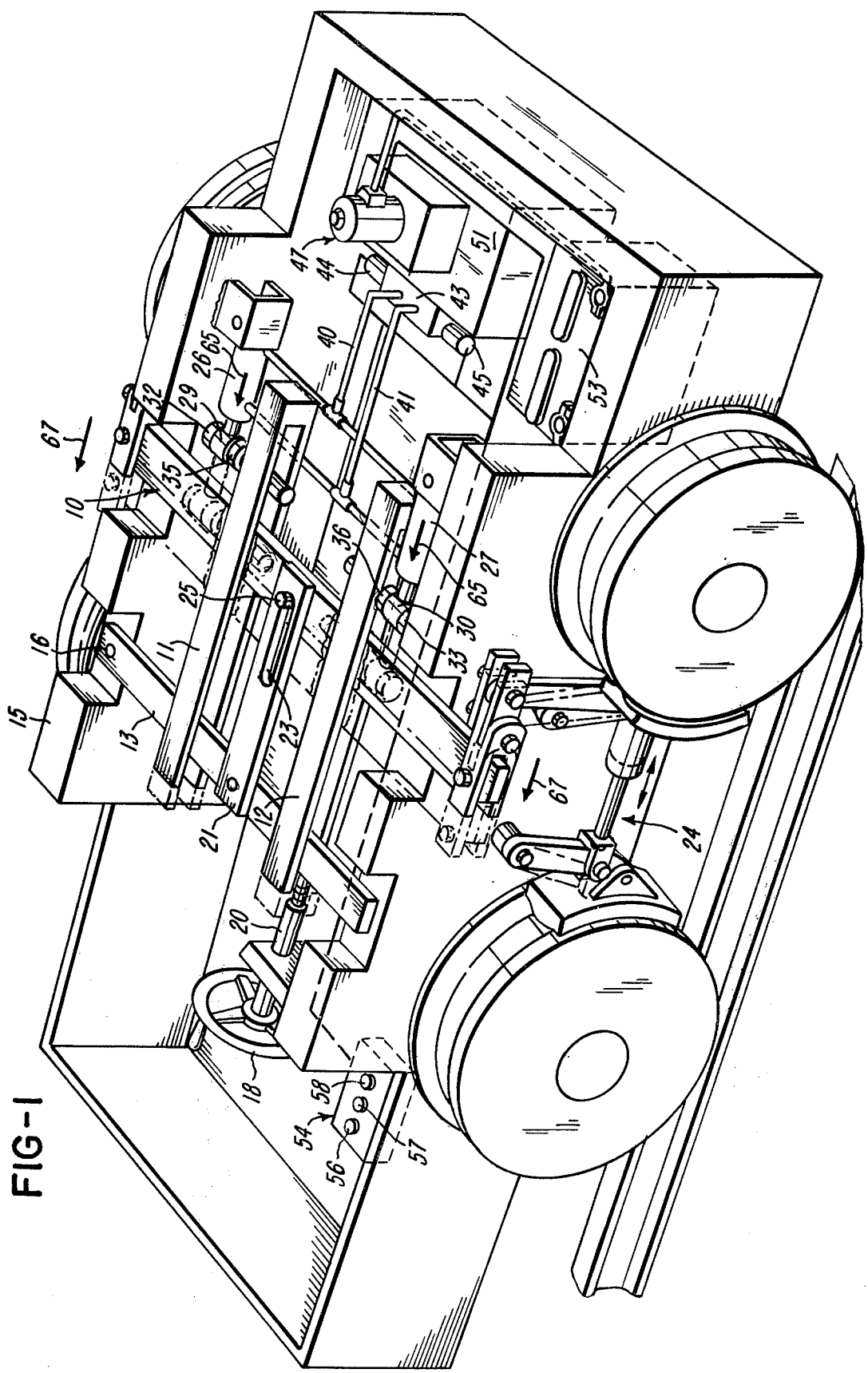
FIG. 1 is a perspective view of the apparatus of this invention.

Referring to the drawing in detail, and FIG. 1 in particular, the auxiliary braking apparatus of this invention comprises a mechanical braking member in the form of a cross bar 10 having welded thereto guide members in the form of forks 11 and 12 which encompass the existing pivotal brake arm 13. The brake arm 13 is pivotally mounted to the mine locomotive frame 15 by any suitable means such as bolts or pins 16, and is normally operated by a hand wheel 18 through a worm gear or screw means 20. This hand wheel is used to operate the brake arm 13 as a primary braking system to which the present invention customarily constitutes a separate and independent auxiliary system.

A slide member 21 attached to the brake arm 13, has a longitudinal slot 23 at one end for slidable engagement with a pin 25, which is secured to crossbar 10.

Conventional braking means including front and rear acting linkage and arcuate brake shoes, generally denoted at 24, are attached to the two outermost ends of the crossbar 10.

A pair of hydraulic jacks 26 and 27 are pivotally mounted to the frame. Eyelets 29 and 30 on the end of the jack shaft or piston rod receive bolts 32 and 33 and are retained by nuts 35 and 36, respectively. The threaded end portion of the bolts 32 and 33 are slidably contained in the fork-shaped guide members 11 and 12.

Hydraulic lines 40 and 41 connect the jacks 26 and 27 to a valve 43, which is operated by solenoids 44 and 45. A motor-operated pump 47, containing a motor 48 and a pump 49, is mounted over a reservoir 51. The electrical system has a standard battery 53 and a push button switch 54 which has push puttons 56, 57, and 58 mounted thereon. In actual practice it has been found that a standard twelve volt battery can be employed to cause activation of the braking system in accordance with this invention. The system is a battery-operated system regardless of the voltage which is used to energize it.

It should be clearly understood, however, that the present invention can be employed as a primary system of dual utility with an existing mechanical system in that it is independently operative. In such cases, the manually operated mechanical system serves as an auxiliary brake.

Figure 2:
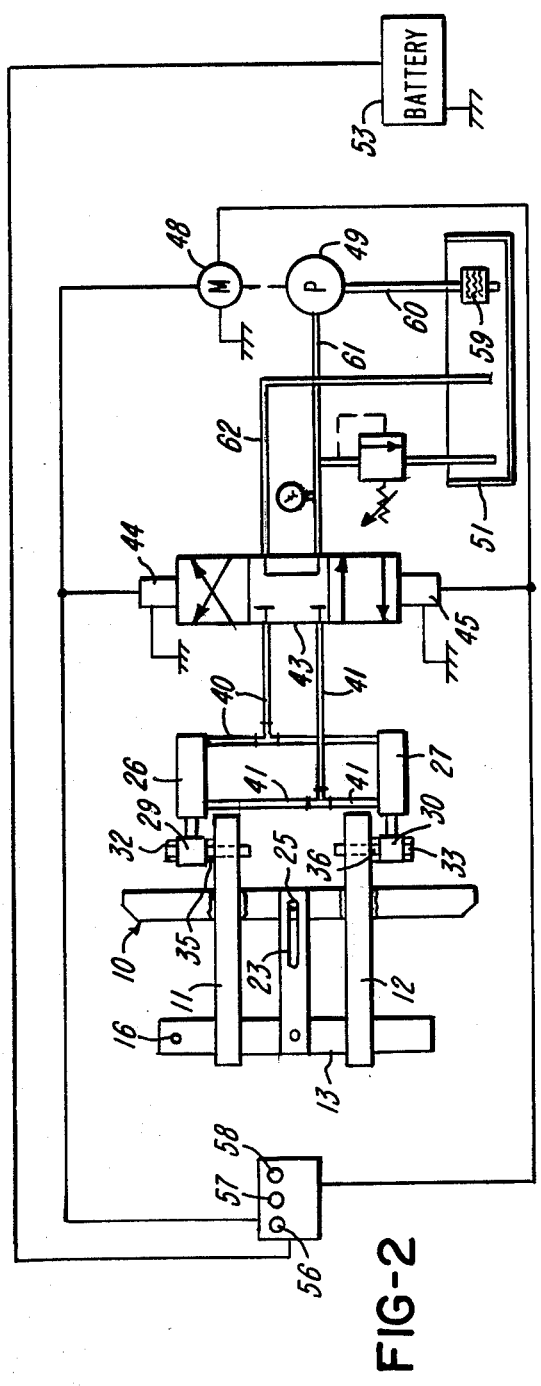
FIG. 2 is a diagrammatic view showing generally the hydraulic and electrical systems.

The diagramatical showing of the hydraulic and electrical systems in FIG. 2 in essence represents a flow chart indicating the connections between the electrical and hydraulic components of the braking system of this invention. This will be discussed in further detail in accordance with the description below of how the braking system operates.

OPERATION OF THE BRAKING SYSTEM

The electric motor 48 has battery 53 as a source of energy. Motor 48 and the solenoid 44 are energized by pressure on push button 56. This action simultaneously starts the pump 49 and activates the valve 43. Hydraulic fluid is then pumped from the reservoir 51 through a filter 59 through lines 60 and 61 into the valve 43. Line 61 has a pressure gauge and a release valve therein. Fluid flow proceeds through the valve 43, through line 40 and into the ends of the jacks 26 and 27. Thus, the piston rod of each jack is moved in the direction that is indicated by the arrows 65, thereby moving the eyelet portions 20 and 30 into abutting relationship with the crossbar 10. The shank portions of the nuts 32 and 33 are slidably received in the guide members 11 and 12 of the crossbar 10, to maintain positive longitudinal movement of the piston rods and eyelets 29 and 30. This assures contact with the crossbar 10 and the eyelets 29 and 30. Thus, the crossbar 10 is moved in the direction of the arrows 67, actuating the mechanical brake means 24, which are of the type well known in the art. As noted previously these brake means include brake shoes which apply pressure to all four locomotive wheels. It should be observed that the hydraulic cylinders of jacks 26 and 27 are self-adjusting to the brake shoes in proportion to the wear upon the shoes. Hence, as long as some amount of shoe remains, the hydraulic cylinders will force the shoes to stop the locomotive.

The amount of travel of the crossbar 10 can be limited by the length of the slot 23 which receives the pin 25 of the crossbar 10. When the button or switch 56 is released, the solenoid allows the valve 43 to return to its neutral position, thereby maintaining pressure on the brake 24 through jacks 26 and 27. Release of switch 56 also de-energizes the motor 48 and pump 49.

Pressure on switches 57 and 58 will again energize the motor 48 and pump 49; and the solenoid 45 is then energized. Fluid is now pumped from line 61 through valve 43 into line 41, thereby returning the piston rod and eyelets 29 and 30 of jacks 26 and 27, respectively, to their initial position. Thus, pressure is removed from crossbar 10 and the braking means 24, thereby permitting release of the brake shoes from the mine locomotive wheels.

Although the drawing illustrates use of two switches 57 and 58, to release the brake (as a safety feature), it should be clear to those skilled in the art that a single switch or contact would be employed.

SUMMARY

There has been described a compact, comparatively inexpensive, uncomplicated, battery-operated independent mine locomotive braking system capable of stopping the locomotive within a matter of a few seconds. The system of this invention is readily capable of retrofit to most existing mine locomotives without interfering with their existing brake systems. The braking system of this invention comprises a switch for energizing a pair of solenoids; a battery for activating a motorized pump for pumping liquid respectively to and from a plurality e.g., a pair of hydraulic jacks laterally spaced and mounted along or on opposite sides of the locomotive frame; output members (usually pistons, bars or cylinders) each of which may, but need not necessarily, have an eyelet portion to which slidable extension means are connected; guide members fixedly secured to a crossbar to slidably receive said eyelet extensions; a brake arm pivotally mounted to the locomotive frame and having a longitudinal slot at one end for slidable engagement with a pin secured to the crossbar; braking means attached at the two ends of the crossbar, including arcuate brake shoes for contacting the outer surfaces of the locomotive wheels and stopping them, and means to expand the brake shoes out, forward and backward so as to contact the wheels; and hydraulic lines connecting the hydraulic jacks to a valve operated by the solenoids, whereby activation of the switch causes the outer portions of the jack output members to push the crossbar advancing it into contact with the brake arm, thereby moving or expanding the brake shoes into contact with the locomotive wheels and stopping them.

What is claimed is:

1. A dual braking system for a mine locomotive having a frame comprising,
   a crossbar extending transversely across the locomotive frame and being slidable along the longitudinal axis of the locomotive frame, said crossbar having end portions terminating adjacent to wheels mounted on opposite sides of said locomotive frame;
   brake shoe assemblies including arcuate brake shoes positioned on said sides of said locomotive frame adjacent to said wheels;
   said crossbar end portions being connected to said brake shoe assemblies to move said brake shoes into frictional engagement with said wheels;
   a pair of hydralic jacks being laterally spaced and mounted on the opposite sides of said locomotive frame with the output members for each said jack having an eyelet portion to which a slidable extension means is connected;
   a pair of fork-shaped guide members being laterally spaced and secured to said crossbar, each said guide member slidably receiving therein a respective said extension means between said crossbar and the closed end of said guide member;
   a brake locomotive being pivotally mounted adjacent one end thereof to said locomotive frame and slidable in said pair of fork-shaped guide members, a slide member being pivoted to said brake arm and having a longitudinal slot at one end thereof for slidable engagement with a pin secured to said crossbar;
   a hand operated wheel connected to a screw mechanism and to said brake arm to pivot said brake arm and thereby apply a force to said crossbar through said slide member and said pin to move said brake shoes into said frictional engagement with said wheels;
   a hydraulic pump for pumping fluid respectively to and from said pair of hydraulic jacks through a conduit means having a solenoid operated valve means therein, said solenoid operated valve means controlling the flow of said fluid through said conduit means and being actuated by a switch means;
   said switch means actuating said valve means to cause said extension means of said pair of hydraulic jacks to abut said crossbar and apply a force thereto to move said brake shoes into said frictional engagement with said wheels;
   said extension means slidably received in said fork-shaped guide members and said longitudinal slot at said one end of said slide member permitting independent operation of either said pair of hydraulic jacks or said hand operated wheel to move said brake shoes into said frictional engagement with said wheels.

2. A braking system as in claim 1 wherein said slidable extension means are comprised of bolts retained on said jack output members by nuts.

3. A braking system as in claim 1 wherein said longitudinal slot serves to restrict lateral movement of said crossbar by restricting the path travelled by the pin secured thereto.

4. A braking system as in claim 1 wherein said switch means has three push buttons: one for energizing one solenoid of said operated valve means to apply the brake shoes; and the other two of said buttons for energizing another solenoid of said solenoid operated valve means to release the brakes upon depression of both of said two buttons.

* * * * *